(12) United States Patent
Gottis

(10) Patent No.: US 6,265,487 B1
(45) Date of Patent: *Jul. 24, 2001

(54) POWDER COATING OF CARBOXYL-CONTAINING POLY(METH) ACRYLIC RESIN AND TRANS(CIS)-DIGLYCIDYL 1,4-CYCLOHEXANEDICARBOXYLATE

(75) Inventor: Philippe-Guilhaume Gottis, Mulhouse (FR)

(73) Assignee: Vantico, Inc., Brewster, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/016,619

(22) Filed: Jan. 30, 1998

Related U.S. Application Data

(63) Continuation of application No. 08/733,288, filed on Oct. 17, 1996, now abandoned.

(51) Int. Cl.[7] .............................. C08L 33/02; C08L 63/00
(52) U.S. Cl. ........................................... 525/119; 525/108
(58) Field of Search ..................................... 525/119, 108

(56) References Cited

U.S. PATENT DOCUMENTS

| | | | |
|---|---|---|---|
| 3,444,237 | 5/1969 | Jaffe | 260/468 |
| 3,859,314 | 1/1975 | Dukes et al. | 260/348.6 |
| 4,255,553 | 3/1981 | Mizumura et al. | 528/93 |
| 4,521,570 * | 6/1985 | Watanabe et al. | 525/533 |
| 5,294,683 | 3/1994 | Cotting et al. | 525/524 |
| 5,322,907 | 6/1994 | Cotting et al. | 525/438 |
| 5,457,168 | 10/1995 | Cotting et al. | 525/533 |

FOREIGN PATENT DOCUMENTS

| | | |
|---|---|---|
| 2319815 | 11/1973 | (DE) . |
| 2654306 | 6/1977 | (DE) . |
| 0462053 | 12/1991 | (EP) . |
| 0506617 | 9/1992 | (EP) . |
| 0536085 | 4/1993 | (EP) . |
| 0697440 | 2/1996 | (EP) . |
| 1409835 | 10/1975 | (GB) . |
| 1542709 | 3/1979 | (GB) . |
| 53-140395 | 12/1978 | (JP) . |

OTHER PUBLICATIONS

Chem. Abst. 90(26): 205989J for JP 53140395, 7/98.
Data Sheet SCX–819, 1996.
Chem. Abst. 72: 101295, 1970.

* cited by examiner

*Primary Examiner*—Robert E. L. Sellers
(74) *Attorney, Agent, or Firm*—Lyon & Lyon LLP

(57) ABSTRACT

A powder coating hardener based on epoxide compounds having a molecular weight of no more than 1500, which is solid at room temperature, the epoxide compounds consisting of 60 to 100% by weight of diglycidyl 1,4-cyclohexanedicarboxylate in the form of the pure trans-isomer or of a cis/-trans-isomer mixture having a melting point (peak maximum of the DSC scan at a heating rate of 10° per minute) of above 70° C., and of 0 to 40% by weight of other epoxide compounds, and wherein 0 to 15% by weight of the entire amount of epoxide compounds can contain aromatic structural elements in the molecule. The powder coating hardeners give powder coatings based on poly(meth)acrylic resins having free carboxyl groups, which have good flow even at low temperatures.

5 Claims, No Drawings

POWDER COATING OF CARBOXYL-CONTAINING POLY(METH)ACRYLIC RESIN AND TRANS(CIS)-DIGLYCIDYL 1,4-CYCLOHEXANEDICARBOXYLATE

This application is a continuation of application Ser. No. 08/733,288 filed Oct. 17, 1996, abandoned.

The present invention relates to a powder coating hardener based on epoxide compounds having a molecular weight of no more than 1500, to a powder coating which contains said hardener and which is based on solid poly(meth)acrylic resins, i.e. on resins which are obtainable by polymerisation of monomers which contain acrylic and/or methacrylic monomers, as well as to the use of this powder coating as automotive lacquer.

Powder coating hardeners based on epoxide compounds having a molecular weight of no more than 1500 are known and are used, in particular, when the binder of the powder coating contains free carboxyl groups. A known powder coating is, for example, that by Johnson Wax Speciality Chemicals Product Application Bulletin, Powder Coatings, which comprises triglycidyl isocyanurate as hardener and a poly(meth)acrylic resin having free carboxyl groups as binder. However, one of the disadvantages of these powder coatings is that their flow is only sufficiently good at relatively high temperatures and said powder coatings are therefore not suitable for use in the temperature range from 140 to 150° C. which is required in the case of, for example, automotive lacquers.

It has now been found that powder coatings based on a binder having free carboxyl groups and comprising a hardener which is solid at room temperature (15° to 30° C.) and which is based on low-molecular epoxide compounds, the essential component of which is diglycidyl 1,4-cyclohexanedicarboxylate in the form of the pure trans-isomer or of a cis-/trans-isomer mixture having a melting point of above 70° C., have the desired good flow even when they are processed, i.e. applied and stoved, in the temperature range from 130 to 150° C.

Accordingly, this invention relates to a powder coating hardener which is solid at room temperature and which is based on epoxide compounds having a molecular weight of no more than 1500, the epoxide compounds consisting of 60 to 100% by weight of diglycidyl 1,4-cyclohexanedicarboxylate in the form of the pure trans-isomer or of a cis-/trans-isomer mixture having a melting point (defined as peak maximum of the DSC scan at a heating rate of 10° C. per minute) of above 70° C., and of 0 to 40% by weight of other epoxide compounds, and wherein 0 to 15% by weight of the entire amount of epoxide compounds can contain aromatic structural elements in the molecule.

The invention also relates to powder coatings based on one or more than one poly(meth)acrylic resin which contains the powder coating hardener of this invention, as well as to the use thereof as automotive lacquer.

In addition to the desired flow behavior, the powder coatings based on the hardener of this invention have good reactivity in the temperature range from 130 to 150° C. as well as very good storability in the range from room temperature to moderately elevated temperatures, e.g. in the range 40° C.; accordingly, they have a good reactivity/stability ratio. That form of diglycidyl 1,4-cyclohexanedicarboxylate which is intended as powder coating hardener according to this invention furthermore has hardly any plastifying action and shows no clotting tendency, which substantially facilitates processing the compositions to powder coatings, making it, in particular, easier to comminute the composition after it has been homogenised e.g. in an extruder, and prevents caking when stored.

Those forms of diglycidyl 1,4-cyclohexanedicarboxylate which can be used as hardeners according to this invention are obtainable in simple manner, e.g. by treating an isomer mixture of trans- and cis-1,4-cyclohexanedicarboxylic acid, such as is also commercially available, with water in the temperature range from about 80 to 95° C., at which the cis-isomer dissolves, giving a form of the 1,4-cyclohexanedicarboxylic acid which is sufficiently enriched with the trans-isomer. This form can then be glycidylised in customary manner by reaction with epichlorohydrin as is described, inter alia, in U.S. Pat. No. 3,859,314.

Although those novel powder coating hardeners are preferred in which the epoxide compounds consist to 100% by weight of diglycidyl 1,4-cyclohexanedicarboxylate in the form of a pure trans-isomer or of a cis-/trans-isomer mixture having a melting point of above 70° C., it is also possible that the epoxide compounds of the hardener consist of up to 30 to 40% by weight of other epoxide compounds, preferably of other diglycidyl or polyglycidyl esters.

Up to 15% by weight of the entire amount of epoxide compounds of a powder coating hardener of this invention can comprise aromatic structural elements; a higher proportion is not to be recommended because of the marked decrease of fastness to weathering. These epoxide compounds include, for example, the corresponding glycidyl esters which are mentioned in EP-A-0 506 617 and in EP-A-0 536 085, both descriptions of which are regarded as component of this description, as hardeners for powder coatings which are based on acid polyesters and which contain aromatic groups, in particular diglycidyl phthalate, diglycidyl isophthalate or diglycidyl terephthalate or triglycidyl trimesate or triglycidyl trimellitate.

In the case of aliphatic or cycloaliphatic epoxide compounds it is possible to use other epoxide compounds in amounts higher than 15% by weight or an additional proportion of other epoxide compounds exceeding this amount.

The aliphatic epoxide compounds are conveniently aliphatic polyglycidyl di- or polycarboxylates, preferably the aliphatic polyglycidyl polycarboxylates containing 2 to 50, more preferably 2 to 20, carbon atoms which may, in addition to the carboxyl groups, also contain other functional groups. Typical examples of suitable aliphatic polycarboxylic acids are oxalic acids, malonic acid, succinic acid, glutaric acid, adipic acid, pimelic acid, subaric acid, azelaic acid or sebacic acid. Hardeners which are also suitable for the purposes of this invention are aliphatic polyglycidyl esters of formula (I) given below, wherein $X_1$, $X_2$, $X_3$, $X_4$, $X_5$ and $X_6$ are each independently of one another a hydrogen atom, a $C_1$–$C_4$alkyl group or a group of formula (II) given below, and A in formula (II) is an alkylene group containing 2 to 4 carbon atoms, preferably an ethylene group, and Y is a hydrogen atom or a methyl group:

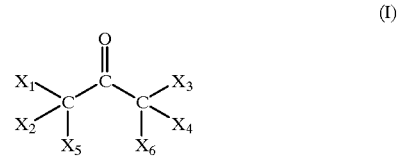

(I)

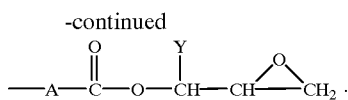

Polyglycidyl esters of formula (I) are disclosed, inter alia, in EP-A-0 506 617. Specific examples are glycidyl acetone-1,1,3,3-tetrapropionate and glycidyl pentanone-(3)-2,2,4,4-tetrapropionate.

Preferred aliphatic polyglycidyl polycarboxylates are diglycidyl oxalate, diglycidyl succinate, diglycidyl adipate, diglycidyl sebacate, diglycidyl azelate.

The cycloaliphatic epoxide compounds are conveniently cycloaliphatic polyglycidyl di- or polycarboxylates, i.e. polyglycidyl di- or polycarboxylates which are based on a carbon backbone containing one or more than one cycloaliphatic ring and which is free from C—C multiple bonds or of aromatic groups. The individual cycloaliphatic rings can contain one or more than one substituent, typically $C_1$–$C_6$alkyl, chloro, bromo or hydroxyl substituents and preferably contain 5 to 10 carbon atoms. If the polycarboxylic acid contains two or more cycloaliphatic rings, then these may be fused or linked via suitable atom groups, in particular via straight-chain or branched aliphatic groups of valency 2–6 having e.g. 1 to 30 carbon atoms which may also contain one or more than one hetero atom, typically a sulfur atom, nitrogen atom or, preferably, oxygen atom, as well as substituents, such as chloro, bromo or hydroxyl substituents. Typical examples of such linking groups are those of formula —$CH_2$—, —$C(CH_3)_2$—, >CH—, >$C(CH_3)$—, >C< or

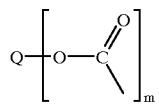

wherein Q is an organic radical of valency 2–6 containing preferably 2 to 15 carbon atoms and which is free from C—C double bonds. Specific examples of cycloaliphatic polyglycidyl polycarboxylates which are suitable according to this invention are diglycidyl hexahydrophthalate, diglycidyl hexahydroisophthalate, diglycidyl hexahydroterephthalate, diglycidyl methylhexahydrophthalate, diglycidyl 2,5-dimethylhexahydrophthalate, diglycidyl endomethylenehexahydrophthalate, diglycidyl 1,8-, 2,3- and 2,6-decalindicarboxylates, triglycidyl cyclohexanetricarboxylates, such as triglycidyl hexahydrohemimellitate or, preferably, triglycidyl hexahydrotrimesate as well as triglycidyl hexahydrotrimellitate, tetraglycidyl hexahydromellophanate (cyclohexane-1,2,3,4-tetracarboxylic acid) or tetraglycidyl hexahydropyrromellitate (cyclohexane-1,2,4,5-tetracarboxylic acid). Polyglycidyl cyclohexanepolycarboxylates can, for example, also be obtained in conventional manner from the corresponding cyclohexanepolycarboxylic acids by reaction with epichlorohydrin. Where not commercially available, the cyclohexanepolycarboxylic acids can, for example, be prepared by hydration of the corresponding benzene-polycarboxylic acids in accordance with U.S. Pat. No. 3,444,237.

The cycloaliphatic polyglycidyl esters disclosed in DE-A-23 19 815 and EP-A-0 506 617 are also well suited for the powder coatings of this invention. These have the formula (III) given below, wherein n is an integer from 2 to 9, preferably from 2 to 3, and $X_1$, $X_2$, $X_3$ and $X_4$ are each independently of one another a hydrogen atom, a $C_1$–$C_4$alkyl group or a group of the above-mentioned formula (II):

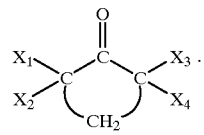

Illustrative examples of this type of compounds are cyclopentanone-2,2,5,5-tetra(propionic acid glycidyl ester), cyclohexanone-2,2,6,6-tetra(propionic acid glycidyl ester) or cyclooctanone-2,2-di(propionic acid glycidyl ester).

Other cycloaliphatic polyglycidyl esters suitable for this invention are the diglycidyl esters of the formula given below, which are also disclosed in EP-A-0 506 617, wherein $X_7$ is an aliphatic or cycloaliphatic group of valency m containing 2 to 30 carbon atoms, the carbon chain of which may be interrupted by one or more than one hetero atom, typically a nitrogen atom, sulfur atom or, preferably, oxygen atom and which is unsubstituted or substituted and can contain in particular hydroxyl, chloro or bromo substituents, and wherein m is an integer from 2 to 6, and $X_8$ and $X_9$ are each independently of the other a hydrogen, chloro or bromo atom, a $C_1$–$C_4$alkyl group, or one of $X_8$ or $X_9$ is a group of the formula (V) given below, the other having one of the meanings stated above:

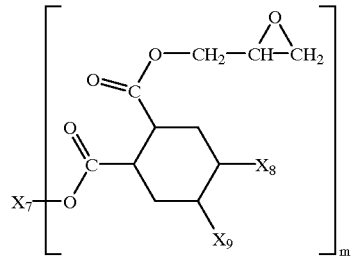

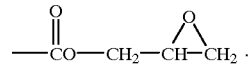

$X_7$ is preferably a di- to quadrivalent radical which is derived from an aliphatic polyalcohol containing 2 to 10 carbon atoms, which may be oligomerised, typically from glycol, glycerol, trimethylolpropane or bis (trimethylolpropane), or from polyether polyols by removal of 2 to 4 hydroxyl groups, or is a di- to quadrivalent, preferably divalent, group having the following molecular structure

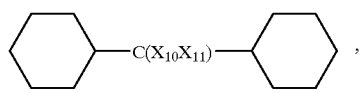

wherein $X_{10}$ and $X_{11}$ are each independently of the other a hydrogen atom, a $C_1$–$C_4$alkyl group or a cyclohexyl group. $X_{10}$ and $X_{11}$ are particularly preferably either a hydrogen atom or a methyl group. Particularly preferred compounds of this structure have the formulae (G—$CH_2$)$_3$C—$C_2H_5$, (G—$CH_2$)$_2$C($C_2H_5$)—$CH_2$—O—$CH_2$—($C_2H_5$)C($CH_2$—G)$_2$, (G—$CH_2$)$_2$CH(OH) as well as G—($C_6H_4$)—C($CH_3$)$_2$—

($C_6H_4$)—G, wherein G corresponds in each case to a group of formula (VI) and $X_8$ is either a hydrogen atom or a group of the above formula (V):

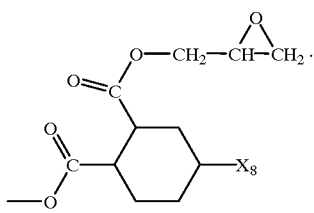

(VI)

The other cycloaliphatic epoxide compounds are preferably triglycidyl 1,2,4-cyclohexanetricarboxylate, triglycidyl 1,3,5-cyclohexanetricarboxylate or polyglycidyl compounds of the above formula (III) or (IV).

Those epoxide compounds which, probably owing to their low free glycidyl cis-1,4-cyclohexanedicarboxylate content, may be present in the powder coating hardeners of this invention in addition to the glycidyl 1,4-cyclohexanedicarboxylate can be epoxy resins which are solid or liquid at room temperature. Those epoxide compounds which are liquid at room temperature are employed in the form of solid mixed phases (of solid solutions) which are formed from epoxy resins which are liquid at room temperature as well as from epoxy resins which are solid at room temperature, including that form of glycidyl 1,4-cyclohexanedicarboxylate which is used according to this invention, as is described in more detail in EP-A-0 536 085. Higher percentages of other liquid epoxide compounds, however, require the use of a form of glycidyl 1,4-cyclohexanedicarboxylate which has a relatively low cis-isomer content because otherwise it is not possible to obtain compositions of epoxide compounds which are solid at room temperature.

Accordingly, the invention also relates to a powder coating hardener, as described above, wherein the epoxide compounds form a composition which is solid at room temperature, comprising epoxide compounds which are liquid at room temperature as well as epoxide compounds which are solid at room temperature, and wherein at least part of those epoxide compounds which are solid at room temperature is present in the form of a solid mixed phase or of a mixture of several solid mixed phases and wherein all those epoxide compounds which are liquid at room temperature are components of one or more than one of this mixed phase.

Said solid composition can, for example, contain the epoxide compounds in the following ratio:

70–95% by weight of glycidyl 1,4-cyclohexanedicarboxylate in the form of the pure transisomer or of a cis-/trans-isomer mixture having a melting point of above 70° C., 5–30% by weight of another epoxide compound which is liquid at room temperature or of a mixture of several such epoxide compounds, and 0–25% by weight of another epoxide compound which is solid at room temperature or of a mixture of several such epoxide compounds, the percentages relating to the total amount of epoxide compounds in the composition and adding up to a maximum of 100% by weight.

The solid mixed phases can be prepared, for example, by heating a mixture of the solid and liquid epoxy resins until the mixture is completely liquid, and then, if necessary, homogenising and cooling the mixture and, if necessary, comminuting the product so obtained, or by dissolving solid and liquid epoxy resins together in an inert solvent and then removing the solvent until the solid mixed phases precipitate, which can then be isolated. Solid solutions of specific epoxy resins, in particular of polyglycidyl polycarboxylates, can also be obtained in particularly elegant manner by homogeneously mixing the polycarboxylic acids and then glycidylising the mixture so obtained in conventional manner. These preparation processes are described in the EP-A-0 536 085 cited above.

Poly(meth)acrylic resins having free carboxyl groups which are suitable for the powder coatings of this invention can be obtained in known manner by copolymerisation of acrylic and/or methacrylic monomers, such as of $C_1$–$C_{12}$alkyl(meth)acrylates, typically methyl(meth)acrylate, ethyl(meth)acrylate, propyl(meth)acrylate, butyl(meth)acrylate, pentyl(meth)acrylate, hexyl(meth)acrylate, octyl(meth)acrylate, 2-ethylhexyl(meth)acrylate, decyl(meth)acrylate and dodecyl(meth)acrylate, $C_1$–$C_4$alkyl(meth)acrylates being preferred, or of (meth)acrylamide with acrylic acid and/or methacrylic acid and, optionally, other additional ethylenically unsaturated comonomers, such as vinylaromatics, e.g. styrene, α-methylstyrene, vinyltoluene or also β-halogenated styrenes. The copolymerisation can be carried out in known manner. It is, for example, possible to dissolve the monomers in suitable organic solvents and to react them thermally in the presence of a suitable initiator which is soluble in the solvent, such as dicumyl peroxide, as well as in the presence of a suitable chain transfer reactant such as thioglycolic acid (solution polymerisation), or to suspend and polymerise the monomer mixture together with a solution of the initiator in an organic solvent in water, or also to emulsify the monomer mixture using surfactants, e.g. sodium lauryl sulfate in water and to react it in the presence of a water-soluble polymerisation initiator, such as $K_2S_2O_8$ (emulsion polymerisation). The ready poly(meth)acrylic resin is then isolated in solid form from the solvent or water. The reaction can also be carried out without using solvents or water, for example in accordance with JP-A-Sho 53-140395. Suitable poly(meth)acrylic resins are solid in the ambient temperature range (15 to 25° C.). They usually have a molecular weight from 1000 to 50000 (medium weight $M_w$), preferably from 5000 to 20000.

The Tg value (glass transition temperature) of the poly(meth)acrylic resins, determined by DSC (heating rate 10° C./minute), is preferably from 40 to 75° C. The acid number of the resins, indicated in mg equivalents of KOH per g (meth)acrylate resin, is preferably from 30 to 160, more preferably from 70 to 140.

The powder coating compositions preferably contain the epoxide resins in such an amount that the ratio of the carboxyl groups of the poly(meth)acrylic resins to the epoxide groups is from 0.5:1 to 2:1.

The powder coatings of this invention can additionally also contain further modifiers conventionally used in the coating industry, typically light stabilisers, curing accelerators, dyes, pigments, e.g. titanium dioxide pigment, deaerators, e.g. benzoin, and/or flow control agents. Suitable flow control agents are typically polyvinyl acetals, such as polyvinyl butyral, polyethylene glycol, polyvinyl pyrrolidone, glycerol, acrylic copolymers such as those available under the trademarks Modaflow® or Acrylron®.

Powder coatings of this invention can be prepared by simple mixing of the components, conveniently in a ball mill. Another possibility, which is more preferred, comprises fusing, mixing and homogenising the components together, preferably in an extruder such as a Buss Ko-kneader, cooling the product and comminuting it. In this connection it is particularly advantageous that the powder coatings of this invention, either immediately after the extrusion or after standing them for some hours, e.g. 24 to 48 hours, become so hard and brittle that they can be easily ground. The powder coating compositions preferably have a particle size in the range from 0.015 to 500 µm, more preferably from 10 to 75 µm. In some cases it may also be expedient to first prepare a masterbatch from part of the binder, the epoxy resins and, optionally, further components, and then mixing and homogenising it in a second step with the remaining binder and the remaining components to give the final powder coating composition.

After application to the object to be coated, the powder coatings are hardened at a temperature of no less than about 100° C., preferably in the range from 120 to 140° C. Normally about 5 to 60 minutes are required for hardening. Materials suitable for coating are all those which are stable at the temperatures necessary for the cure, in particular ceramic materials and metals. The substrate can already have one or more than one coat of base lacquer which is compatible with the powder coating.

A preferred field of application for compositions of this invention are automotive lacquers, i.e. clear lacquers, which are applied as topmost coat on one or more than one coat of base lacquer which is applied to the automobile first. Accordingly, the invention also relates to the use of the above-described powder coating compositions as automotive lacquer.

EXAMPLE

The powder coating compositions (amounts given in grams) cited in Table 1 are homogenised in an extruder (laboratory extruder, supplied by PRISM, The Old Stables, England) in the temperature range from 60 to 80° C. The cooled extrudates are ground to the ready powder coating having a particle size of about 40 µm. The powder coating compositions are sprayed electrostatically on an aluminium sheet precoated with a silver metallic base lacquer (VWL 97A BASF), the coat of base lacquer being 40 µm and the coat of powder coating being 60 µm.

TABLE 1

| Powder coating No | 1 | 2 | 3 |
|---|---|---|---|
| Joncryl SCX 819 (1) | 87 | 87 | 83.8 |
| TGIC (2) | 13 | | |
| trans 1,4 CHDA DGE (3) | | 13 | 16.2 |
| benzoin | 0.3 | 0.3 | 0.3 |
| Modaflow M 2000 (4) | 0.3 | 0.3 | 0.3 |
| Tinuvin 144 (5) | 1.4 | 1.4 | 1.4 |
| Tinuvin 900 (6) | 2.6 | 2.6 | 2.6 |
| extrusion conditions | PRISM 60–80° C./250 rpm | | |
| gelling time 140° C. (s) | 250 | 760 | 540 |
| stoving conditions | 30 min/140° C. | | |
| layer thickness (µm) | 60 | 60 | 60 |
| gloss (20°) | 80 | 80 | 87 |
| gloss (60°) | 100 | 100 | 98 |
| flow (visual) (7) | 1 | 7 | 7 |
| flow LW (8) | 61.5 | 41.4 | 33 |
| flow SN (9) | 153.7 | 88.8 | 75 |
| Tg ° C. powder (10) | 37 | 30 | 25 |
| Tg ° C. hardened syst. | 46 | 55 | 47 |

(1): carboxyl functional acrylate resin, supplied by S C Johnson Wax; acid number: 75 mg of KOH/g substance; ICI melt viscosity: 6000 Mpas at 200° C.; molecular weight (medium weight $M_w$): 17000

(2): triglycidyl isocyanurate
(3): diglycidyl trans 1,4-cyclohexanedicarboxylate
(4): flow control agent based on a butylated polyacrylate
(5): HALS (polyalkylpiperidine compound)
(6): UV absorber
(7): empirical scale from 0 (poor) to 10 (very good) flow determination using the "Wave Scan" profilometer (supplied by Byk)
(8): parameter "Long wave": from >60 (poor) to <30 (very good)
(9): parameter "Subnote": from >150 (poor) to <50 (very good)
(10): The Tg values of this Table were determined by DSC (heating rate: 10° C./min).

Table 1 shows in particular that the flow behaviour of the novel powder coatings No. 2 and 3 is substantially better than that of a powder coating which uses the same binder but the customary powder coating hardener triglycidyl isocyanurate (powder coating 1).

Example 2

A methacrylic resin is prepared in the following manner:

|  | Parts by weight [g] |
|---|---|
| Monomer charge: | |
| methacrylic acid (MAA) | 30 |
| styrene (St) | 20 |
| methylmethacrylate (MMA) | 30 |
| butylmethacrylate (BuMA) | 120 |
| dicumyl peroxide (initiator) | 3.0 |
| thioglycolic acid (chain transfer agent) | 3.5 |
| Reactor charge: | |
| toluene | 60 milliliter |
| dicumyl peroxide (initiator) | 3.0 g |
| thioglycolic acid (chain transfer agent) | 3.5 g |

The mixture which serves as monomer charge is washed with a 4% sodium hydroxide solution and a 20% sodium chloride solution and is then dried over anhydrous sodium sulfate.

The reactor charge is placed in a reaction vessel, equipped with mechanical stirrer, nitrogen inlet, condenser, heating, thermometer and a metering pump for the continuous inlet of the monomer charge. With nitrogen flushing, the temperature of the base mixture is raised to 110° C. such that the toluene is under reflux. The monomer charge is then added to the reactor charge in the reaction vessel over a period of 3 hours, and the viscosity of the mixture in the reaction vessel increases towards the end of this charging. The mixture is heated to 110° C. for about another 6 hours and is then cooled to room temperature. The toluene is removed by evaporation, the remaining copolymer is dissolved in ether, precipitated with hexane, isolated by filtration and then dried.

The copolymer so obtained has a molecular weight ($M_w$) of 10330 (determined by GPC, using a polystyrene standard; $M_w/M_n$=4.7), a glass transition temperature ($T_g$ value) of 45.8° C., and comprises 1.98 equivalents of free carboxyl groups per kilogram of copolymer.

The powder coating compositions (amounts given in grams) cited in Table 2 are homogenised in an extruder (laboratory extruder, supplied by PRISM, The Old Stables, England) in the temperature range from 60 to 80° C. The extrudates are cooled and ground to the ready powder coating having a particle size of about 40 μm. The powder coating compositions are sprayed electrostatically on an aluminium sheet precoated with a silver metallic base lacquer (VWL 97A BASF), the coat of the base lacquer being 40 μm and the coat of powder coating being 60 μm.

TABLE 2

| Powder coating No. | 4 | 5 | 6 |
|---|---|---|---|
| methacrylic resin | 82 | 77 | 82 |
| TGIC | 18 | | |
| trans 1,4 CHDA DGE | | 23 | 18 |
| benzoin | 0.3 | 0.3 | 0.3 |
| Modaflow M 2000 | 0.3 | 0.3 | 0.3 |
| Tinuvin 144 | 1.4 | 1.4 | 1.4 |
| Tinuvin 900 | 2.6 | 2.6 | 2.6 |
| extrusion conditions | PRISM 60–80° C./250 rpm | | |
| gelling time 140° C. (s) | 270 | 1000 | 830 |
| stoving conditions | 60 min/140° C. | | |

Table 2 (continuation) shows that flow behaviour as well as gloss of the novel powder coatings No. 5 and 6 are very good. A powder coating based on the same methacrylic resin binder and using triglycidyl isocyanurate as hardener (powder coating 4), on the other hand, shows such bad gloss at an angle of 20° that it could not be employed in practice.

Table 2 (continuation)

| Powder coating No. | 4 | 5 | 6 |
|---|---|---|---|
| coat thickness (μm) | 60 | 60 | 60 |
| gloss (20°) | 42 | 86 | 86 |
| gloss (60° C.) | 86 | 98 | 96 |
| flow (visual) | 0 | 9 | 7 |
| flow LW | * | 19 | 31 |
| flow SN | * | 46 | 71 |
| Tg ° C. powder | 38 | 29 | 27 |
| Tg ° C. hardened syst. | 43 | 44 | 42 |

*not determined

Example 3

Methacrylic resin A is prepared according to Example 2 using the following monomer reactor charge:

| | Parts by weight [g] |
|---|---|
| Monomer charge: | |
| methacrylic acid (MAA) | 15 |
| styrene (St) | 15 |
| methylmethacrylate (MMA) | 30 |
| butylmethacrylate (BuMA) | 40 |
| dicumyl peroxide (initiator) | 15 |
| thioglycolic acid (chain transfer agent) | 1.75 |
| Reactor charge: | |
| toluene | 30 milliliter |
| dicumyl peroxide | 1.5 g |
| thioglycolic acid | 1.75 g |

65 g of trans diglycidyl 1,4-cyclohexanedicarboxylate are blended with hexahydrotrimellitic acid triglycidylester. The blend is heated until a clear melt is received. By cooling the melt a solid solution of the glycidylesters is obtained (Solid Solution I)

The powder coating compositions (amounts given in grams) cited in Table 3 are homogenised and ground according to the description of Example 2. The powder coating compositions are sprayed electrostatically on an aluminium sheet precoated with a silver metallic base lacquer (VWL 97A BASF), the coat of the base lacquer being 40 μm. The thickness of the powder coating is shown in Table 3.

TABLE 3

| Powder coating No. | 7 | 8 | 9 |
|---|---|---|---|
| methacrylic resin A | 78.63 | 74.49 | 73.5 |
| trans 1,4 CHDA DGE | — | 20.88 | — |
| Solid Solution I | — | — | 21.68 |
| TGIC | 16.97 | — | — |
| catalyst (11) | — | 0.056 | 0.053 |
| benzoin | 0.29 | 0.27 | 0.29 |
| Modaflow M 2000 | 0.29 | 0.27 | 0.29 |
| Tinuvin 144 | 1.31 | 1.24 | 1.31 |
| Tinuvin 900 | 2.51 | 2.37 | 2.51 |
| extrusion conditions | PRISM 70° C./250 rpm | | |
| gelling time 140° C. (s) | 175 | 387 | 295 |
| stoving conditions | 30 min/140° C. | | |
| coat thickness (μm) | 45 | 44 | 44 |
| gloss (20°) | 17 | 76 | 71 |
| gloss (60° C.) | 59 | 99 | 98 |
| flow (visual) | 1 | 6 | 6 |
| flow LW | ** | 44 | 53 |
| flow SN | ** | 97 | 123 |

(11): Trimethylhexadecylammonium bromide
** not determined

Table 3 (continuation) shows that flow behaviour as well as gloss of the novel powder coatings No. 8 and 9 are good. A powder coating based on the same methacrylic resin binder and using triglycidyl isocyanurate as hardener (powder coating 7), on the other hand, shows such bad gloss at an angle of 20° that it could not be employed in practice.

What is claimed is:

1. A powder coating composition based on one or more than one poly(meth)acrylic resins having free carboxyl groups and having an average molecular weight of 5,000 to 20,000 (weight average), which composition comprises a hardener based on epoxide compounds having a molecular weight of no more than 1500, which is solid a room temperature, the epoxide compounds consisting of 100% by weight of diglycidyl 1,4-cyclohexanedicarboxylate in the form of a pure trans-isomer or of a cis-/trans-isomer mixture having a melting point (peak maximum of the DSC scan at a heating rate of 10° C. per minute) of above 70° C.

2. A powder coating composition to claim 1, wherein the Tg value of the poly(meth)acrylic resins having free carboxyl groups, determined by DSC (heating rate 10° C. per minute), is from 40 to 75° C.

3. A powder coating composition according to claim 1, wherein the acid number of the poly(meth)acrylic resins having free carboxyl groups, indicated in milligram equivalents of KOH per gram of poly(meth)acrylic resin, is from 30 to 160.

4. A powder coating composition according to claim 3, wherein the acid number of the poly(meth)acrylic resins having free carboxyl groups, indicated in milligramm equivalents of KOH per gram of poly(meth)acrylic resin, is from 70 to 140.

5. Automotive lacquer according to claim 1.

* * * * *